(12) United States Patent
Hall

(10) Patent No.: US 11,345,518 B2
(45) Date of Patent: May 31, 2022

(54) BAG RESEALING DEVICE

(71) Applicant: Grayson Hall, Memphis, TN (US)

(72) Inventor: Grayson Hall, Memphis, TN (US)

( * ) Notice: Subject to any disclaimer, the term of this patent is extended or adjusted under 35 U.S.C. 154(b) by 0 days.

(21) Appl. No.: 16/931,334

(22) Filed: Jul. 16, 2020

(65) Prior Publication Data

US 2020/0346822 A1 Nov. 5, 2020

Related U.S. Application Data

(63) Continuation-in-part of application No. 16/280,549, filed on Feb. 20, 2019, now abandoned, which is a continuation-in-part of application No. 15/790,209, filed on Oct. 23, 2017, now abandoned.

(60) Provisional application No. 62/418,434, filed on Nov. 7, 2016.

(51) Int. Cl.
| | |
|---|---|
| *B65D 33/16* | (2006.01) |
| *B65B 51/06* | (2006.01) |
| *B65D 33/25* | (2006.01) |
| *C09J 7/40* | (2018.01) |
| *B65D 75/58* | (2006.01) |
| *B31B 160/10* | (2017.01) |

(52) U.S. Cl.
CPC .......... *B65D 33/165* (2013.01); *B65B 51/065* (2013.01); *B65D 33/1691* (2013.01); *B65D 75/5805* (2013.01); *B65D 75/5888* (2013.01); *B31B 2160/10* (2017.08); *B65D 33/2508* (2013.01); *C09J 7/40* (2018.01); *Y10T 428/14* (2015.01)

(58) Field of Classification Search
CPC .............. B65D 33/165; B65D 33/1691; B65D 75/5805; B65D 75/5888; B65D 33/2508; B65B 51/065; B31B 2160/10; C09J 7/40; Y10T 428/14; Y02W 30/80
See application file for complete search history.

(56) References Cited

U.S. PATENT DOCUMENTS

| | | | | |
|---|---|---|---|---|
| 2,188,039 A | * | 1/1940 | Farmer | B65D 33/1691 |
| | | | | 383/78 |
| 3,069,366 A | * | 12/1962 | Schwarz | B01J 39/19 |
| | | | | 521/29 |
| 3,203,621 A | * | 8/1965 | Wright | B65D 33/1691 |
| | | | | 383/81 |
| 4,691,373 A | * | 9/1987 | Ausnit | A44B 19/34 |
| | | | | 156/66 |
| 5,211,482 A | * | 5/1993 | Tilman | B65D 33/2508 |
| | | | | 383/202 |
| 5,749,658 A | * | 5/1998 | Kettner | B29C 48/12 |
| | | | | 383/204 |

(Continued)

FOREIGN PATENT DOCUMENTS

GB 2491646 A * 12/2012 ......... B65D 33/1691

*Primary Examiner* — Patricia L. Nordmeyer
(74) *Attorney, Agent, or Firm* — David J. Kreher

(57) ABSTRACT

A bag resealing device that is reusable for use with prepackaged bags to prevent spillage and/or aid in food preservation. The reusable nature of the bag resealing device is a result of a plurality of paired adhesive strips and the plurality of perforations wherein each pair of adhesive strips can be individually exposed to allow the bag resealing device to be attached to a different prepackaged bag. The perforations enable the bag resealing device to have the used paired adhesive strips to be torn off to allow the removal of the used pair of adhesives.

2 Claims, 2 Drawing Sheets

(56) References Cited

U.S. PATENT DOCUMENTS

| | | | |
|---|---|---|---|
| 9,238,526 B2* | 1/2016 | Anzini | B65D 33/2508 |
| 2006/0137997 A1* | 6/2006 | Bein | B65D 5/643 |
| | | | 206/204 |
| 2008/0267539 A1* | 10/2008 | Howell | B65D 33/2508 |
| | | | 383/64 |
| 2008/0267542 A1* | 10/2008 | Greco | B65D 33/2566 |
| | | | 383/210.1 |
| 2011/0162329 A1* | 7/2011 | So | B65D 33/2533 |
| | | | 53/469 |
| 2013/0089275 A1* | 4/2013 | Montoya | B65D 33/2508 |
| | | | 383/42 |
| 2013/0089280 A1* | 4/2013 | Tseng | B65D 75/5805 |
| | | | 383/204 |
| 2013/0202227 A1* | 8/2013 | DaCosta | B65D 33/1691 |
| | | | 383/42 |
| 2015/0055892 A1* | 2/2015 | Exner | B65D 33/16 |
| | | | 493/213 |
| 2016/0016694 A1* | 1/2016 | Tseng | B65D 33/2508 |
| | | | 383/204 |

* cited by examiner

BAG RESEALING DEVICE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

DESCRIPTION

Field of the Invention

This disclosure relates to a reusable bag resealing device for use with prepackaged bags that do not have resealing devices already attached.

Background of the Invention

This application is a continuation in part of U.S. patent application Ser. No. 16/280,549 filed Feb. 20, 2019, which was a continuation in part of U.S. patent application Ser. No. 15/790,209 filed Oct. 23, 2017, and Ser. No. 15/790,209 is a divisional of U.S. Provisional Patent Application No. 62/418,434 filed Nov. 7, 2016. The benefit of the earlier filing dates of the aforementioned U.S. Non-Provisional patent application Ser. No. 16/280,549 U.S. Non-Provisional patent application Ser. No. 15/790,209, and U.S. Provisional Patent Application No. 62/418,434, is hereby claimed.

Many goods are sold in bags that are manufactured without the ability to reseal the bag after first opening without the use of what is known as a twisty-tie. The present disclosure reveals a bag resealing device to be used with these bags to prevent materials from falling out of the bags and/or to aid in preserving the products within the bag.

SUMMARY OF THE INVENTION

The present disclosure reveals a reusable bag resealing device to be used with prepackaged bags without resealing mechanisms such as a zip closer or press closure. The bag resealing device involves two sheets wherein the left edges and the right edges of the sheets are sealed together.

Near the top edge of the resealing device is a resealable mechanism. In the first embodiment of the of the location of the resealable mechanism, the resealable mechanism is located along the top edge of the front sheet and the top edge of the back sheet. In the second embodiment of the location of the resealable mechanism, the resealable mechanism is located in the area of the top edge of the front sheet and the top edge of the front sheet and the top edge of the back sheet are sealed together.

In the area of the bottom edge of the interior of the front sheet and the bottom edge of the interior of the back sheet are a plurality of paired adhesives, said adhesive being covered by removable adhesive covers when the bag resealing device is not in use. Said adhesive extending from the left edge across to the right edge continuously on both the front sheet and the back sheet. There are a plurality of paired adhesives, each covered with a removable adhesive cover so that the bag resealing device is reusable.

In the first embodiment of the adhesive, the adhesive adheres to the front sheet and the back sheet and when affixed to a bag, cannot be removed without causing damage to the bag resealing device. In the second embodiment of the adhesive, the adhesive adheres to the front sheet and the back sheet and when affixed to a bag, can be removed without causing damage to the bag resealing device.

Between each of the plurality of paired adhesives is a perforation so that once a pair of adhesives is used it can be removed.

DETAILED DESCRIPTION OF THE INVENTION

Figure 1:
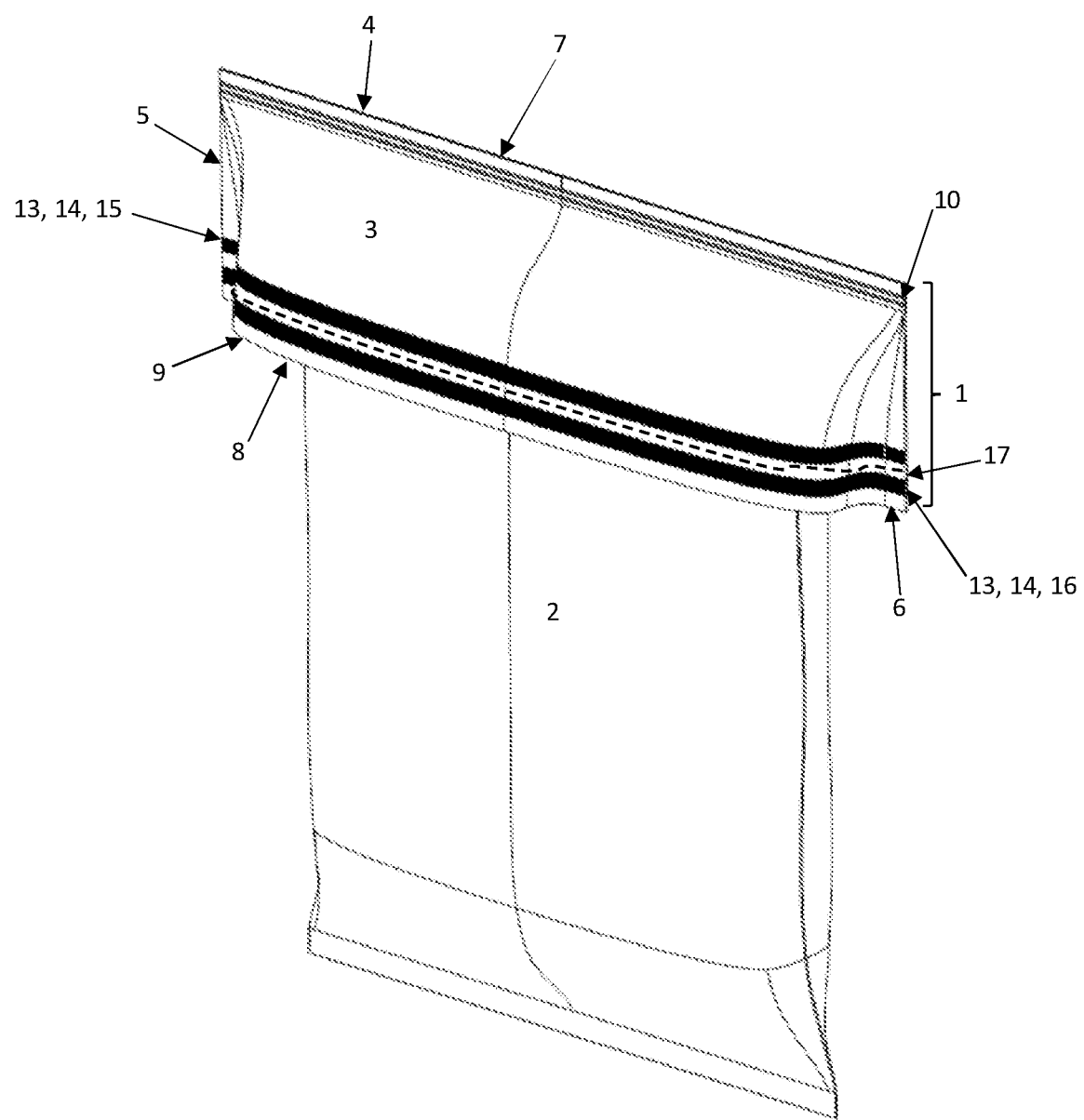
FIG. 1 is a view of the bag resealing device attached to the open end of a prepackaged bag.
Figure 2:
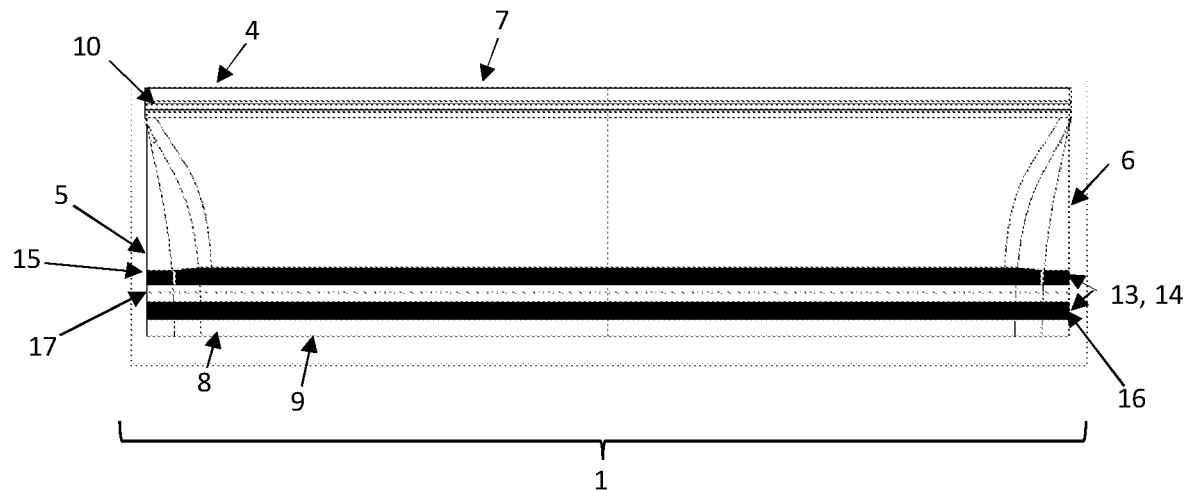
FIG. 2 is a view of the bag resealing device with the resealable mechanism position on the top edge of the front and back and a plurality of paired adhesives and a perforation in the space between each of the plurality of paired adhesives.
Figure 3:
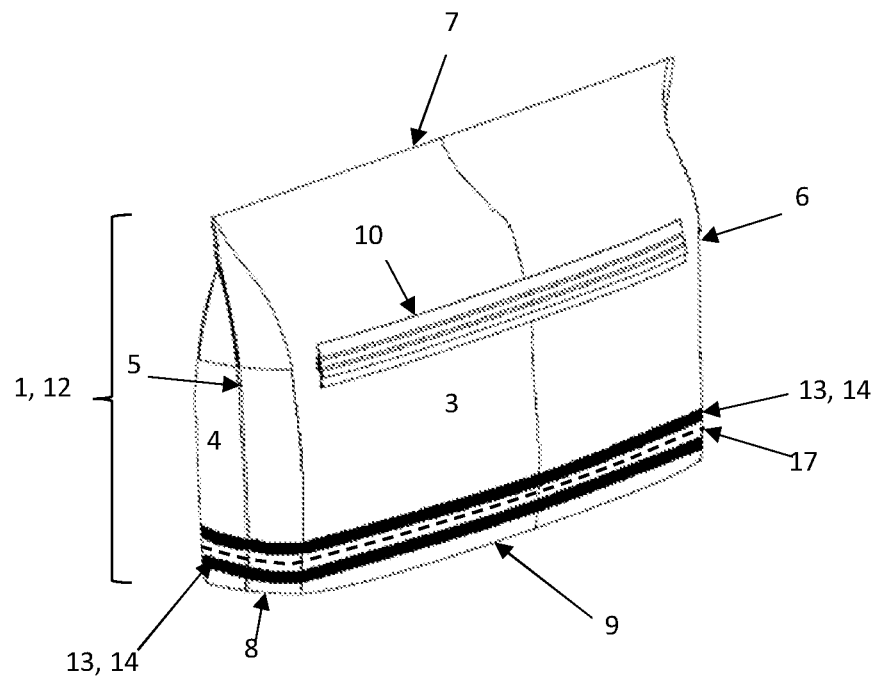
FIG. 3 is a view of the bag resealing device with the resealable mechanism positioned in the area of the top edge of the front sheet.

The present disclosure reveals a bag resealing device 1 for use with prepackaged bags 2 to prevent spillage and/or aid in food preservation, wherein examples of prepackaged bags include but are not limited to bags containing chips, vegetables, meats, fruits, cotton balls, etc. The bag resealing device 1 comprises a front sheet 3, a back sheet 4, a left edge 5, a right edge 6, a top edge 7, a bottom edge 8, and an interior 9. The left edge 5 of the front sheet 3 and the left edge 5 of the back sheet 4 are sealed together. The right edge 6 of the front sheet 3 and the right edge 6 of the back sheet 4 are sealed together. In the area of the top edge 7 is a resealable mechanism 10 such as a zipper seal or press seal.

In the first embodiment of the bag resealing device 1, the resealable mechanism 10 is positioned along the top edge 7 of the front sheet 3 and the top edge 7 of the back sheet 4, such that the bag resealing device 1 can be operated to allow the bag resealing device 1 to be opened and closed.

In the second embodiment 12 of the bag resealing device 1, the resealable mechanism 10 is located in the front sheet 3 in the area of the top edge 7 such that the resealable mechanism 10 can be operated to allow the bag resealing device 1 to be opened and closed. In this embodiment the top edge 7 of the front sheet 3 and the top edge 7 of the back sheet 4 are sealed together.

The bag resealing device 1 further comprises a plurality of paired adhesives 13 and a removable adhesive cover 14 for each of adhesive 13 of the plurality of paired adhesives 13. For each pair of adhesives 13 there is an adhesive 13 located on the interior 9 of the front sheet 3 in the area of the bottom edge 8 and an opposing adhesive of the plurality of paired adhesives on the interior 9 of the back sheet 4 in the area of the bottom edge 8, wherein the adhesive 13 on the front sheet 3 and the adhesive 13 on the back sheet 4 are co-located so as to adhere to the prepackaged bag 2 to which the adhesive shall adhere. The removable adhesive cover 14 is positioned over each adhesive 13 to prevent the adhesive 13 on the front sheet 3 and the adhesive 13 on the back sheet 4 from adhering to each other when the bag resealing device 1 is not in use.

As an example, consider the situation wherein there is a first pair of adhesives 15 of the plurality of adhesives 13 and a second pair of adhesives 16 of the plurality of adhesives 13. The first pair of adhesives 15 have an adhesive 13 on the front sheet 3 and an adhesive on the back sheet 4 and the adhesives 13 are co-located so that when the removable adhesive covers 14 of this pair of adhesives 15 are removed the first pair of adhesives 15 are capable of attaching to a prepackaged bag 2. The second pair of adhesives 16 also have an adhesive 13 on the front sheet 3 and an adhesive 13 on the back sheet 4 and they are co-located so that when the individual removable adhesive covers 14 of this pair of adhesives 16 is removed the second pair of adhesives 16 are capable of attaching to the prepackaged bag 2. Because the coverings 14 for the first pair of adhesives 15 can be removed without the removal of the removable adhesive covers 14 for the second pair of adhesives 16, the bag resealing device 1 is reusable.

The adhesive 13, may be such that the adhesive 13 on the front sheet 3 and the adhesive 13 on the back sheet 4 adheres in such a fashion that the adhesive 13 cannot be removed from the prepackaged bag to which is attached without damaging the bag resealing device 1. In this instance, once the bag resealing device 1 is attached to a prepackaged bag 2, the prepackaged bag 2 would need to be torn away from the bag resealing device 1 before another pair or adhesives 13 of the plurality of adhesives 13 could be used to attach the bag resealing device 1 to a different prepackaged bag 2 and thus reuse the bag resealing device 1.

The adhesive 13, may also be such that the adhesive 13 on the front sheet 3 and the adhesive 13 on the back sheet 4 adheres in such a fashion that the adhesive 13 can be separated from that to which it is adhered to. The ability to separate the bag resealing device 1 from the prepackaged bag 2 allows the bag resealing device 1 to be reusable, either by attaching the bag resealing device 1 to another prepackaged bag 2 using the same pair of adhesives 13, or by removing the removable adhesive covers 14 from another pair of adhesives 13 of the plurality of paired adhesives 13 and using the newly uncovered pair of adhesives 13 to attach the bag resealing device 1 to another prepackaged bag 2.

There are also a plurality of perforations so that between each of the plurality of paired adhesives 13 is a perforation 17 to enable the removal of the used pair of adhesives, said plurality of perforations to be at least one perforation.

What is claimed:

1. A bag resealing device for use with prepackaged bags to prevent spillage and/or aid in food preservation said bag resealing device consisting of:
   a front sheet, a back sheet, a left edge, a right edge, a top edge, a bottom edge, an interior, a resealable mechanism, a plurality of paired adhesives, a removable adhesive cover for each adhesive of the plurality of paired adhesives, and a plurality of perforations;
   the left edge of the front sheet and the left edge of the back sheet are sealed together;
   the right edge of the front sheet and the right edge of the back sheet are sealed together;
   the resealable mechanism is positioned along the top edge of the front sheet and the top edge of the back sheet, such that the bag resealing device can be operated to allow the bag resealing device to be opened and closed;
   an adhesive for each of the plurality of paired adhesives is affixed on the interior of the front sheet in the area of the bottom edge, with an opposing adhesive for that pair of adhesives of the plurality of paired adhesives located on the interior of the back sheet in the area of the bottom edge, wherein the adhesive for that pair of the plurality of paired adhesives on the front sheet and the adhesive for that set of the plurality of paired adhesives on the back sheet are co-located so as to adhere to a prepackaged bag;
   wherein the adhesive on the front sheet and/or the adhesive on the back sheet adheres in such a fashion that the adhesive cannot be removed from that to which is adheres without damaging the bag resealing device;
   the removable adhesive cover is positioned over each adhesive of the plurality of paired adhesives to prevent the adhesive on the front sheet and the adhesive on the back sheet from adhering to each other when the bag resealing device is not in use;
   the removable adhesive covers for a pair of adhesives of the plurality of paired adhesives can be removed to expose the adhesive without having to remove the removable adhesive covers of all of the plurality of paired adhesives, allowing each pair of adhesives of the plurality of paired adhesives to be exposed one at a time;
   between each of the plurality of paired adhesives is a perforation of the plurality of perforations to enable the removal of the used pair of adhesives; and
   wherein the bag resealing device adheres to the prepackaged bag by the used pair of adhesives and wherein the bag resealing device can be separated from the used pair of adhesives by tearing the bag resealing device along the perforation between the used pair of adhesives and the unused pair of adhesives, to allow the bag resealing device to be reusable.

2. A bag resealing device for use with prepackaged bags to prevent spillage and/or aid in food preservation said bag resealing device consisting of:
   a front sheet, a back sheet, a left edge, a right edge, a top edge, a bottom edge, an interior, a resealable mechanism, a plurality of paired adhesives, a removable adhesive cover for each adhesive of the plurality of paired adhesives, and a plurality of perforations;
   the left edge of the front sheet and the left edge of the back sheet are sealed together;
   the right edge of the front sheet and the right edge of the back sheet are sealed together;
   the top edge of the front sheet and the top edge of the back sheet are sealed together;
   the resealable mechanism is located in the front sheet in the area of the top edge such that the resealable mechanism can be operated to allow the bag resealing device to be opened and closed;
   an adhesive of each of the plurality of paired adhesives is affixed on the interior of the front sheet in the area of the bottom edge, with an opposing adhesive of that pair of adhesives of the plurality of paired adhesives located on the interior of the back sheet in the area of the bottom edge, wherein the adhesive for that pair of the plurality of paired adhesives on the front sheet and the adhesive for that set of the plurality of paired adhesives on the back sheet are co-located so as to adhere to a prepackaged bag;
   wherein the adhesive on the front sheet and the adhesive on the back sheet adheres in such a fashion that the adhesive cannot be removed from that to which is adheres without damaging the bag resealing device;

the removable adhesive cover is positioned over each adhesive of the plurality of paired adhesives to prevent the adhesive on the front sheet and the adhesive on the back sheet from adhering to each other when the bag resealing device is not in use;

the removable adhesive covers for a pair of adhesives of the plurality of paired adhesives can be removed to expose the adhesive without having to remove the removable adhesive cover of all of plurality of paired adhesives, allowing each pair of adhesives of the plurality of paired adhesives to be exposed one at a time;

between each of the plurality of paired adhesives is a perforation of the plurality of perforations to enable the removal of the used pair of adhesives; and wherein the bag resealing device adheres to the prepackaged bag by the used pair of adhesives and wherein the bag resealing device can be separated from the used pair of adhesives by tearing the bag resealing device along the perforation between the used pair of adhesives and the unused pair of adhesives, to allow the bag resealing device to be reusable.

\* \* \* \* \*